United States Patent [19]
Smith

[11] 3,989,377
[45] Nov. 2, 1976

[54] EXPOSURE AND HEAT DEVELOPMENT DEVICE

[75] Inventor: David S. Smith, Pittsford, N.Y.

[73] Assignee: Eastman Kodak Company, Rochester, N.Y.

[22] Filed: Dec. 23, 1974

[21] Appl. No.: 535,461

[52] U.S. Cl. ............................. 355/85; 250/316; 355/100
[51] Int. Cl.² ........................................ G03B 27/04
[58] Field of Search ............ 355/85, 78, 97, 99–103; 250/316–319

[56] References Cited
UNITED STATES PATENTS

| | | | |
|---|---|---|---|
| 3,038,994 | 6/1962 | Nelson et al. | 250/319 |
| 3,749,490 | 7/1973 | Ritzerfeld | 355/100 X |
| 3,760,725 | 9/1973 | Ritzerfeld | 250/319 X |
| 3,817,618 | 6/1974 | Riley et al. | 355/97 X |
| 3,836,252 | 9/1974 | Touchette et al. | 355/97 X |

*Primary Examiner*—R. L. Moses
*Attorney, Agent, or Firm*—John D. Husser

[57] ABSTRACT

A device for the processing of uniquely combined thermally developable, photosensitive layers with illuminating means for imagewise exposing one of the photosensitive layers while it is being heated to development temperature and also exposing with another illuminating means another of the photosensitive layers from the image exposed and developed in the first photosensitive layer, the last exposed layer being developed by the same heating imparted thereto for development of the first exposed layer to obtain an image which can be transferred in the same operation to a receiving medium.

11 Claims, 10 Drawing Figures

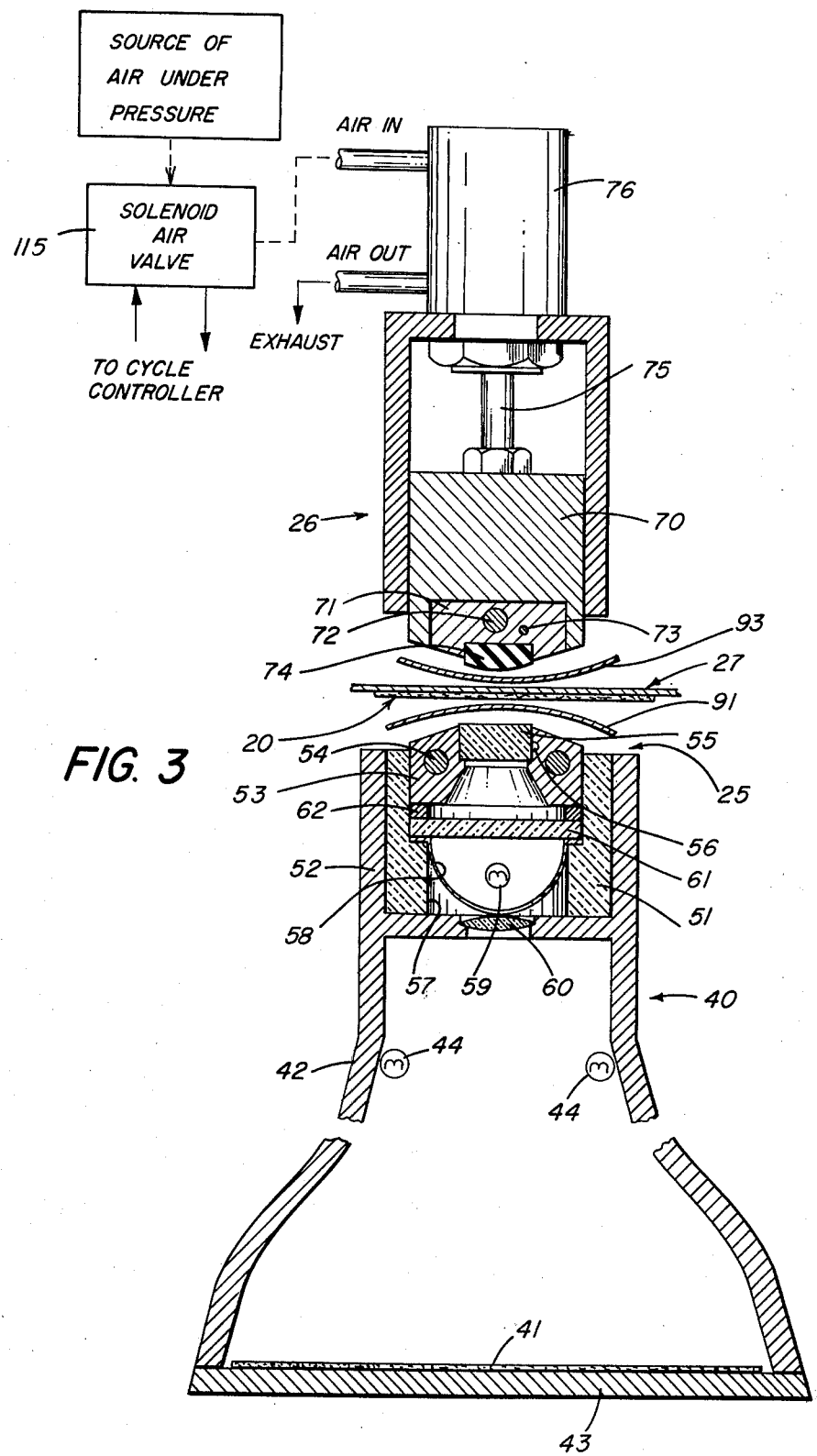

CYCLE

1. INDEX
2. CLAMP
3. EXPOSE
4. HEAT
5. FLASH
6. RELEASE
7. COOL
8. STRIP
5. RELEASE
6. COOL (PARTIAL)
7. FLASH
8. COOL
9. STRIP

TIME →

EXPOSURE AND HEAT DEVELOPMENT DEVICE

FIELD OF THE INVENTION

The present invention relates to photography and more particularly to a device by which a composite film having a heat-light-sensitive layer and a vesicular layer can be exposed and processed and by which the image exposed and developed on the vesicular layer can be transferred to a suitable receiving medium.

DESCRIPTION OF THE PRIOR ART

As is well known, the practice of photography with respect to business systems ordinarily involves recording a light image of a subject, such as a document, letter, memorandum, drawing, etc., on a light-sensitive plate or film as a latent image. By means of the most usual photographic process, which is generally a wet process, the latent image is transformed into a visual image for either further reproduction or viewing. Usually, the making of a reproduction will also involve a wet development process so that at least two separate wet development processes are required in order to obtain the recorded reproduction and a copy or replica of the original therefrom.

It is known that there are now available several processes by which a light-sensitive element or film can be exposed and then dry processed. One such process involves visible light and heat to produce a recorded reproduction of an original, as well as copies from the reproduction. As an example, in the copying of office documents, a copy can be obtained in the form of black opaque letters on a white or light colored background by a process involving merely light and heat. Such a copy can be made in not more than a few seconds and without using any solutions or vapors. One area in which such a copy system is of particular importance, is that in which microfiche cards are used. One of the prime uses to which considerable attention has been given in recent times is that of utilizing a microfiche in conjunction with add-on information. The use of a light-sensitive medium which must be developed by a wet process precludes the use of a microfiche for this purpose because of the development process. On the other hand, with the use of light and heat, areas of a microfiche can be individually exposed and processed so that the add-on feature can be utilized with maximum benefit because information can be added to the microfiche as well as continually updated. Photothermographic compositions are well known and an early disclosure of some such compositions is found in U.S. Pat. No. 1,976,302 which issued in 1934. While the materials disclosed in this patent require a considerable length of time for development and the image contrast may leave much to be desired, there are more recent developments in this area which have produced satisfactory heat-light-sensitive materials. Some of these more recent materials utilized both visible and invisible radiation, such as ultraviolet radiation, to reproduce an image. The image so exposed and developed on the vesicular layer can be transferred to a recording medium which can be a form of microfiche.

SUMMARY OF THE INVENTION

It is an object of the invention to provide a device by which a composite photographic film can be exposed to provide a latent image on a photosensitive layer and to heat process such layer so that the developed image can be used to modulate illumination for exposing another photosensitive layer which is also heat developable.

It is another object of the invention to provide a device by which a heat-light-sensitive composite photographic film can be imagewise exposed sequentially by radiation of spectrally different frequencies to provide an image on each of a corresponding number of layers on the composite film.

It is still another object of the invention to provide a device for exposing and processing uniquely combined heat-light-sensitive elements to obtain an image which can be transferred in the same operation to a receiving medium.

It is still another object of the invention to provide a device for exposing and processing uniquely combined thermally photosensitive materials so as to obtain an image that can be part of or transferred to a separate and distinct receiving medium.

It is yet another object of the invention to provide a device for the processing of uniquely combined thermally developable, photosensitive layers with illuminating means for exposing one of the photosensitive layers while it is being heated to development temperature and also exposing another of the photo-sensitive layers from the image exposed and developed in the first photosensitive layer, the last exposed layer being developed by the heat imparted thereto with the same heating as for development of the first exposed layer to obtain an image which can be transferred in the same operation to a receiving medium.

Other objects and advantages of the invention will be apparent to those skilled in the art by the description which follows and the more detailed description of a specific embodiment of the invention described hereinbelow in conjunction with the drawings.

The objects and advantages of the invention are obtained by a device for imagewise exposing and developing an area of a composite film comprising a heat-light-sensitive layer and a vesicular layer and for transferring at least the developed image area on the vesicular layer to a receiving medium. The device comprises a station for receiving a record medium which can be in the form of a document or a photographic record in the form of a microfiche or strip film. A fixed platen is arranged in an alinged and spaced relation to the receiving station and includes a transparent pressure member and means by which the pressure member can be heated. A reciprocative platen is arranged and aligned in spaced relation to the fixed platen and includes a generally resilient pressure pad and means for heating the same. The reciprocative platen is operatively coupled to means for moving it between a first position in which it is spaced from the fixed platen and a second position in which the pressure member and pressure pad maintain the composite film and receiving medium in intimate contact under pressure. When the platens are in the first position and composite film and the receiving medium can then be positioned therebetween and in the described embodiment the vesicular layer is placed in contact with the receiving medium. When the receiving medium and composite film are so arranged, the platens are then brought into pressure engaging relationship therewith and the record medium is then illuminated for imagewise exposing the same through the transparent pressure member on an area of the heat-light-sensitive layer. At the time this first exposure is made, heat is imparted to the pressure member and pressure pad so that the exposed image area on the heat-light-sensitive layer can be heat developed. At the same time, for the reason set forth hereinbelow, the receiving medium is conditioned for receiving a transferred image area from the vesicular layer. A source of invisible radiation, such as ultraviolet light, is then used to expose the vesicular layer to the heat developed image area on the heat-light-sensitive layer. The heat imparted to the composite film also causes development of the image on the vesicular layer generally simultaneously with the exposure thereof. Upon release of the platens or movement of the reciprocative platen into its first position, the composite film and receiving medium are allowed to cool and, following sufficient cooling, the composite film and recording medium are separated from one another. The vesicular layer then transfers to the receiving medium with the developed image area thereon located in a particular area in accordance with the relationship of the image area to the recording medium when in the clamped position with the composite film for exposure. Suitable means are provided for controlling the sequential operation of the platens, the heating means, the respective sources of visible and invisible radiation, and the transfer step to provide a cycle of operation which makes the process fully automatic. From the following description, it will also become evident to one skilled in the art that various departures from the preferred embodiment can be made and still be within the scope and spirit of the invention.

DESCRIPTION OF THE DRAWINGS

Reference is now made to the accompanying drawings in which like reference numerals and characters indicate like parts and wherein:

FIG. 3 is a vertical sectional view taken through the apparatus or device forming and embodying a preferred structure for use in conjunction with the recording of a single document;

DESCRIPTION OF THE PREFERRED EMBODIMENT

Figure 1:
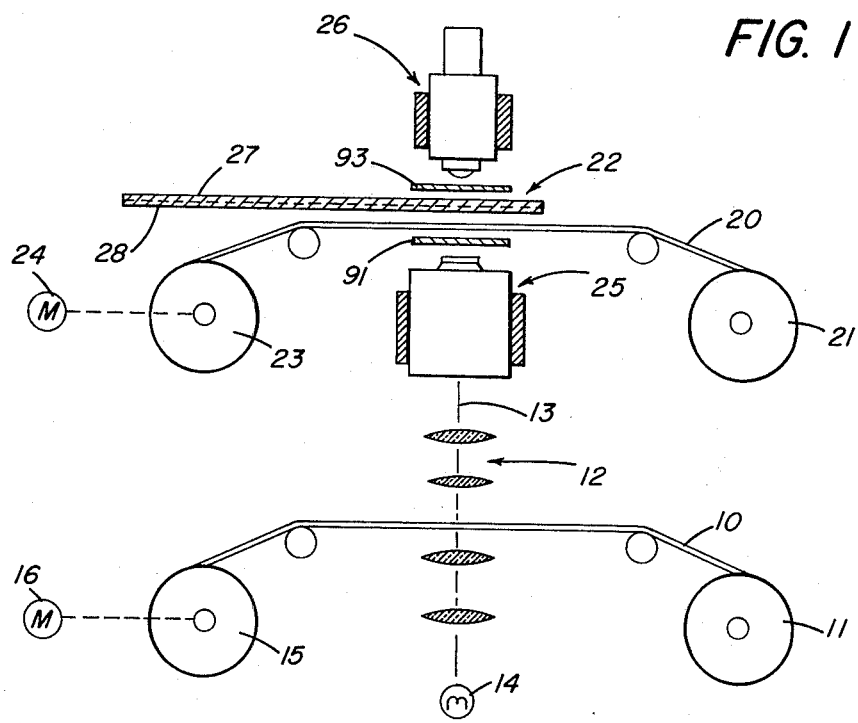
FIG. 1 is a schematic elevational view showing an embodiment of the invention in which the record medium is in the form of a film strip and the receiving medium is in the form of a microfiche.

Particular reference is now made to FIG. 1. In this embodiment which includes the invention, a station for receiving the image to be reproduced receives a photographic film 10 that is wound on a supply reel 11 and fed or threaded through a suitable gate in an optical system 12, having an optical axis 13 and a source of illumination 14, to a takeup reel 15 that is driven by a motor 16 in a conventional manner. The source of illumination 14 can be a projection lamp which provides light that is in the visual portion of the spectrum.

The composite film 20 is carried by a supply reel 21 and threaded through a station designated generally by the numeral 22 to a supply reel 23 that is driven by a motor 24. The film 20 is arranged between a fixed platen 25 and a movable or reciprocative platen 26, the platens 25, 26 being described in more detail hereinafter. A receiving medium designated by the numeral 27 can be in the form of a microfiche and arranged in a suitable carrier 28 that is mounted so as to be movable in X-Y directions relative to the platens 25, 26 and the optical system 12 to position a desired area on the microfiche or receiving medium 27 in the station 22 for exposure and development as described in more detail herainafter.

Figure 2:
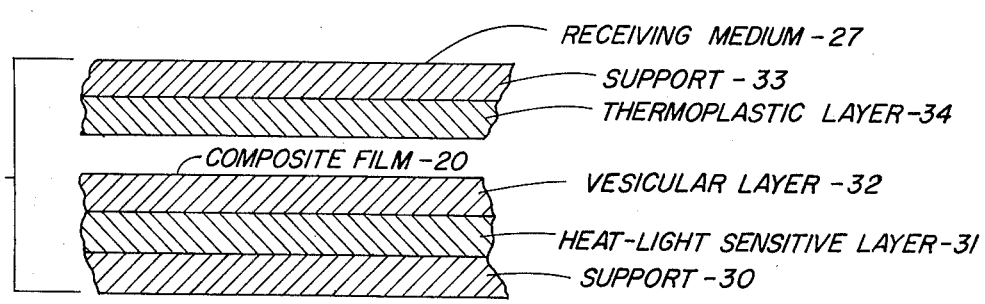
FIG. 2 is a sectional view showing the layers comprising the composite film and receiving medium as used in a preferred embodiment of the invention.

With respect to FIG. 2, the composite film 20 and receiving medium 27 are shown in out-of-scale cross section as comprising, respectively, a support 30 that is transparent and on which a heat-light-sensitive layer 31 is carried. A vesicular layer 32 is applied to and overlies the heat-light-sensitive layer 31. On the other hand, the receiving medium 27 comprises a support 33 that may or may not be transparent and a thermoplastic layer 34. In the embodiment of the invention being described, the composite film 20 and receiving medium 27 are arranged in the station 22 with the vesicular layer 32 facing the thermoplastic layer 34 and in intimate contacting relationship therewith.

In FIG. 3, the platens 25 and 26 are shown in relation to a copy device designated by the numeral 40 in which the image to be reproduced, document 41, is positioned at a receiving station within a housing 42 and on a planar surface or wall thereof designated by the numeral 43. Suitable lamps 44 are arranged in the housing 42 to illuminate the document 41 for exposure in a manner about to be described.

The fixed platen 25 takes substantially the same form and structure whether used in conjunction with a copy device using a filmstrip 10, as shown in FIG. 1, or a single document as shown in FIG. 3. The fixed platen 25 comprises a support block 51 that is carried by or made integral with the upper portion 52 of the housing 42. The support block 51 carries a heater block 53 having at least one heater unit 54 incorporated therein and a transparent pressure member 55 which is carried by the block 53. A temperature sensor 56 is arranged in block 53 adjacent the pressure member 55. The support block 51 is provided with an axial opening 57 in which a reflector 58 is arranged with respect to a light source 59 which will produce a flash illumination. The light source 59 is axially aligned with a lens 60 mounted in the portion 52 of the housing 42. A heat absorbing filter 61 is arranged between the lamp 59 and the transparent member 55 and maintained in position by the block 53 and a spacer 62 by suitable fastening means not shown. The filter 61 is utilized to absorb the heat generated by light source 59 so as to not affect the heat development of the exposed image area on the vesicular layer 32.

The reciprocative platen 26 comprises a member 70 which carries at one end thereof a heater block 71 having therein a heating element 72 and a sensor 73. On the end of the block 71 and facing the transparent pressure member 55, is a pressure pad 74, preferably made of silicone rubber. At the other end, the member 70 is fixed to the rod 75 of the air cylinder 76 which, as described in more detail hereinafter, moves the platen 26 between the first position shown in FIG. 3 in which the platens 25 and 26 are separated so as to permit the composite film 20 and receiving medium 27 to be positioned therebetween and a second position in which the composite film 20 and receiving medium 27 are clamped under pressure and in intimate contact between the transparent member 55 and the pressure pad 74.

Figure 4:
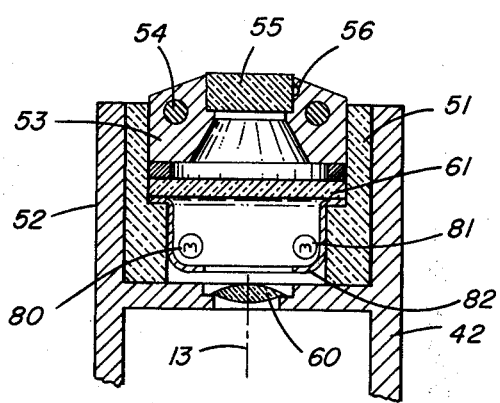
FIGS. 4, 5 and 6 are partial sectional views showing alternate ways in which two exposures of the composite film can be made with sources of illumination of spectrally different frequencies.
Figure 5:
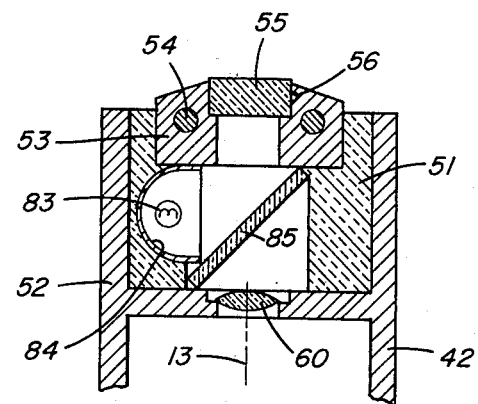
Figure 6:
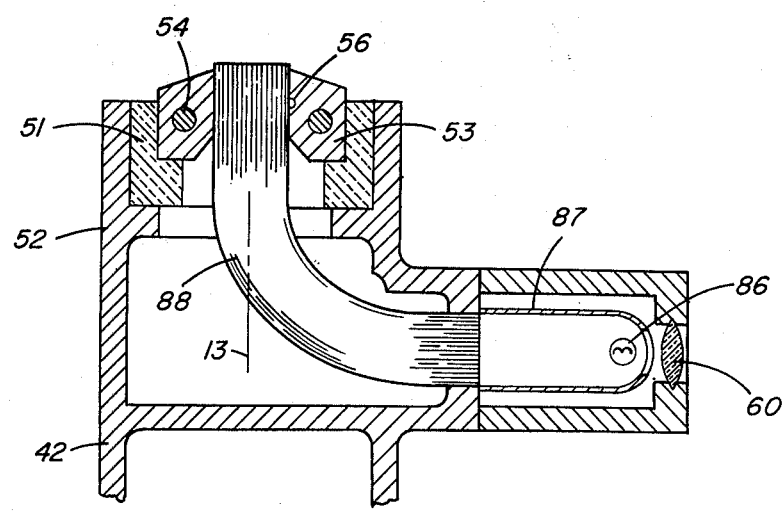
Figure 7:
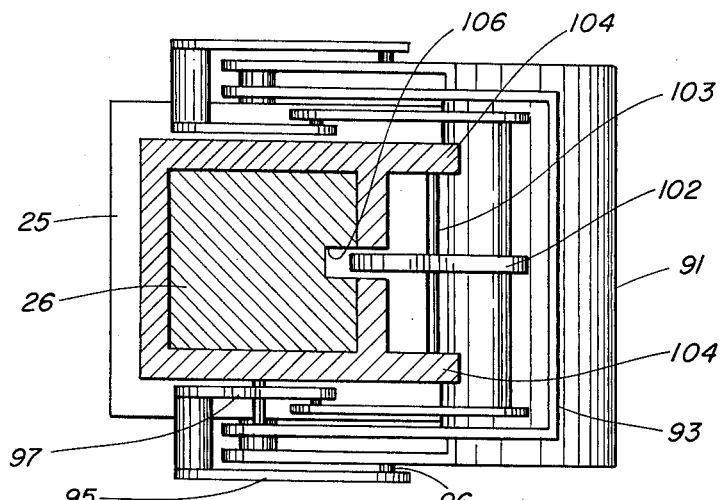
FIGS. 7 and 8 are plan and sectional views of the mechanism used in conjunction with the device for actuating the shielding means utilized in the device to protect the composite film and the receiving medium positioned between the platens until a cycle of operation has been initiated.

With respect to FIGS. 4, 5 and 6, several different embodiments are disclosed for exposing the composite film 20 arranged between the first platen 25 and the movable or reciprocative platen 26. In FIG. 4, the light source 59 is replaced with two light sources 80 and 81 which are arranged to each side of the optical axis 13 for the lens 60. In this arrangement, the reflector 82 takes a shape as best shown in FIG. 4 and is compatible with the structure shown therein. In FIG. 5, a light source 83 is arranged to one side of the optical axis 13 for the device and a reflector 84 is positioned so as to reflect and direct light toward a dichroic mirror 85. In this arrangement, the heat-light-sensitive layer 31 is exposed by the light directed through the lens 60 and transmitted through the dichroic mirror 85. On the other hand, the ultraviolet light from a light source 83 for flash exposing the vesicular layer 32 is reflected from the mirror 85 toward the transparent member 55 and the composite film 20. In FIG. 6, a light source 86 is arranged to one side of the vertical axis 13 of the fixed platen and the lens 60 assumes a position that is moved 90° in the counterclockwise direction from that shown in FIGS. 4 and 5. A reflector 87 is arranged so as to direct the light toward a bundle of fiber optics 88 which transmits the light directly to the composite film 20. In this arrangement, the position of lens 60 and the light source 86 is similar to that shown in FIG. 3 except that they are arranged 90° out of position. The embodiment shown in FIG. 6 can be further modified by utilizing a second bundle of fiber optics which would be curved in the opposite direction so that either exposure to light source 60 or 86 could be made from the opposite side thereby providing a system in which one exposure would be made from the right-hand side and the other from the left-hand side of the fixed platen 25.

In order to protect the composite film 20 and the receiving medium 27 from the heat that might be radiated by the pressure member 55 and the pressure pad 74, shielding means designated generally by the numeral 90 is arranged for movement between the fixed platen 25 and the reciprocative platen 26 in order to reflect such heat and protect the film and receiving medium until a cycle of operation has been initiated. The shielding means 90 comprises two U-shaped members 91 and 93, the one designated by the numeral 91 being pivotally mounted at 92 on the fixed platen 25. The other U-shaped member 93 is pivotally mounted on the stationery portion of the reciprocative platen 26 at 94. The shield 91 is interconnected to the shield 93 by a link 95 pivotally attached to member 91 at 96 and to a member 97 at 98. The member 97 is a bell-crank layer that is also pivotally mounted at 94 on the fixed portion of the reciprocative platen 26 and has an arm 99 pivotally connected to a link 100 at 101, the other end of link 100 being connected to an actuating member 102 which is pivotally mounted at 103 to the extending ears 104 on the fixed portion of the reciprocative member 26. The nose 105 of the member 102 is arranged to engage a recess 106 in the movable portion of the platen 26. In the position shown in FIG. 8, the composite film 20 and the receiving medium 27 are arranged in intimate contact between the fixed platen 25 and the reciprocative platen 26. In this position, the shield members 91 and 93 are in a position in which they are removed from the clamped materials or what might be considered an inoperative position. At the end of the cycle, after the exposures and development steps have been completed, the reciprocative member 26 is moved in an upward direction and, when this occurs, the shield members 91 and 93 are moved into a position between the two platens in order to shield the composite film 20 and receiving medium 27 between cycles of operation.

Figure 9:
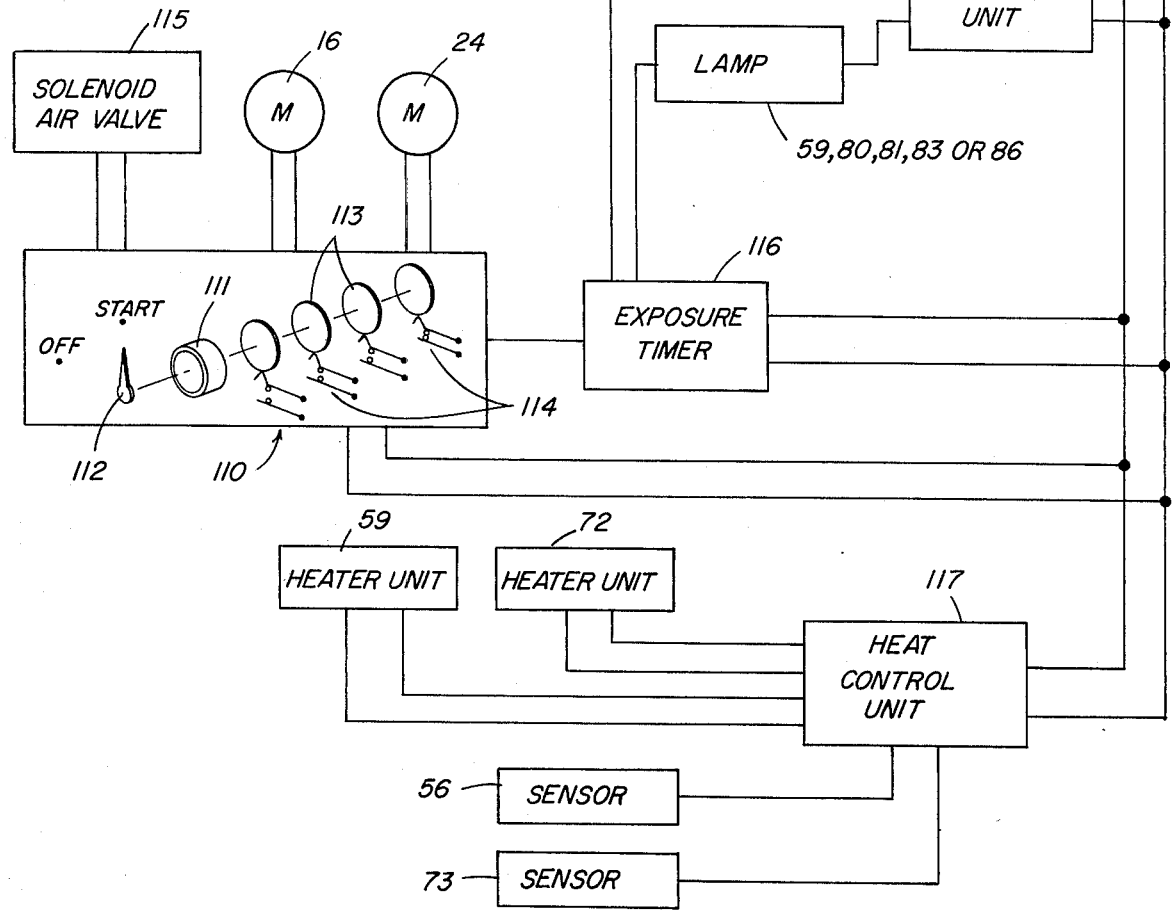
FIG. 9 is a schematic wiring diagram showing the manner in which various elements are interconnected to provide an automatic cycle of operation.

In order to provide an automatic cycle of operation, the control means is shown in FIG. 9. Essentially, such control means 110 comprises a timer motor 111 that is initiated with movement of a switch arm 112 from an OFF to START position. The timer motor 111 has associated therewith a number of cams 113, each of which actuates a respective switch 114. The respective switches 114 are associated with the solonoid air valve 115, the motors 16 and 24, and an exposure timer 116. The cams 113 are designed to provide the necessary time interval of operation in accordance with the cycle diagrammatically shown in FIG. 10. The heat control unit 117 is operative with actuation of switch 112, or a separate switch, and is maintained operative during each full cycle of operation. The actual cycle will be more fully understood when the description which follows is read and considered in conjunction with the drawings.

A cycle of operation with respect to a system such as that shown in FIG. 1 will first necessitate threading the record medium 10 through a gate located relative to the optical system 12 and to the takeup reel 14. Some form of indicating mark showing the position that the first or any other image area on the record medium 10 must assume relative to the gate in order to initiate a cycle of operation can be incorporated on the medium relative to each image area. In the same way, the composite film 20 will be threaded through the space between the shields 91 and 93 and the fixed and movable or reciprocative platens 25, 26. The microfiche 27 will be placed in the carrier 28, which is movable in X–Y directions over the composite film 20 and between the shields 91, 93 and the platens 25, 26. As pointed out hereinabove, the vesicular layer 32 will be arranged so as to face the thermoplastic layer 34 on the receiving medium 27. With the three elements in their respective positions the timer or control switch 112 can be moved from the OFF to the START position, thereby initiating the timer motor 111.

Figure 8:
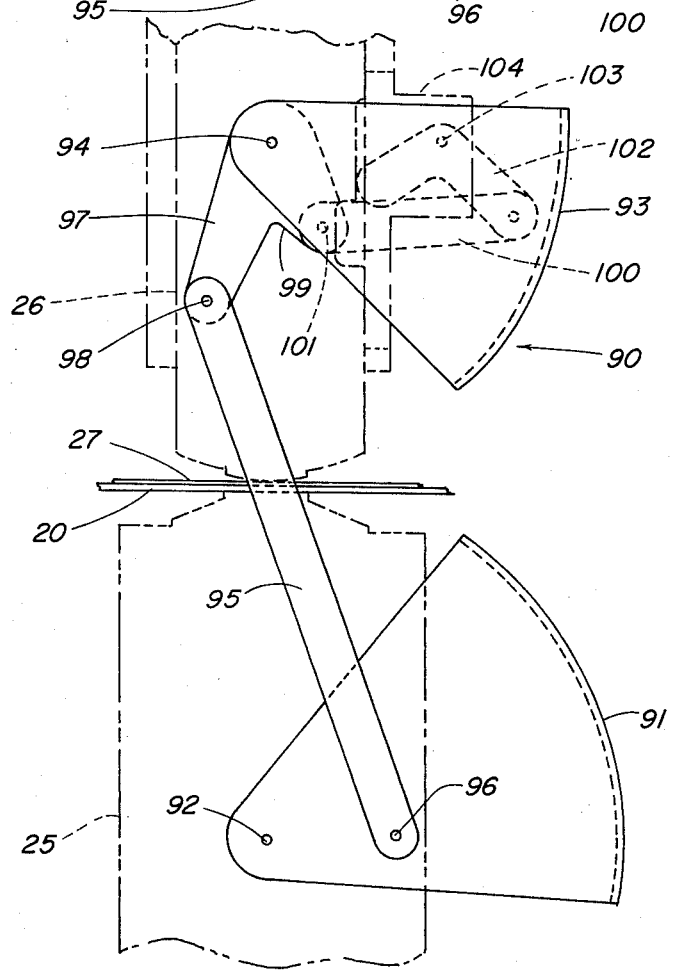

The cam 113 associated with the motor 16 will drive the takeup reel 15 to index an image area on the record medium 10 relative to the optical system 12. The cam 113 associated with the solonoid air valve 115 will then actuate the valve so the piston in the air cylinder 76 will move the reciprocative platen 26 in a direction toward the fixed platen 25. As this occurs, the linkage associated with the shield members 91 and 93 will be actuated to move these members into a position as shown in FIG. 8. When the shield members 91 and 93 have reached the position in which they are clear of the platens 25, 26, the platen 26 will have reached a position in which the pressure pad 74 and the pressure member 55 will be clamping the composite film 20 and the receiving medium 27 in intimate contact therebetween. When this has been accomplished, the cam 113 associated with the exposure timer will actuate its respective switch 114 to energize the lamp 14 via power unit 118 for a period of time to effect imagewise exposure of the heat-light-sensitive layer 31 on the composite film 20 to the image area on the record medium 10 that has been positioned in the gate. This exposure will be effected through the heat-absorbing filter 61 and the transparent pressure member 55, as well as the transparent support 30 of the composite film 20. At the same time that the switch 112 is actuated, the heat control unit 117 will be energized and the heat elements 59, 72 in the platens 25, 26, respectively, will then heat blocks 53, 71. With respect to FIG. 10, it will be noted that the exposure time is terminated prior to the termination of the heat supplied by elements 59, 72. With termination of the heat being applied to member 55 and pad 74, the cam 113 associated with the switch 114 for the exposure timer 116 is actuated to energize the light source 59. At this time, the latent image on the heat-light-sensitve layer 31 will be fully developed and, in effect, by contact printing with light source 59, this same image will be exposed on a corresponding area of the vesicular layer 32. Since heat is applied to both the pressure pad 74 and the pressure member 55, the thermoplastic layer 34 of the receiving medium 27 is conditioned or softened during the time the heat is being applied thereto. Again, with reference to FIG. 10, it will be noted that exposure of the vesicular layer 32 occurs in an interval after the heat has been turned off and the platen 26 is returned to a position in which the pressure is released from the film 20 and the receiving medium 27. However, the heat imparted to the vesicular layer 32 is sufficient to cause development of the image generally simultaneously with its exposure. After a period in which the film and receiving medium can cool while still in contact with one another, they can then be stripped or separated and, when this occurs, the exposed and developed image area on the vesicular layer 32 transfers and adheres to the thermoplastic layer 34 on the receiving medium 27. If the pressure pad 74 is of a good heat conducting material and block 71 is of a good thermally insulating material, the cycle of operation can be slowed and the heat element 72 can then be eliminated.

With respect to the disclosure shown in FIG. 3, the cycle of operation is substantially the same except that the document 41 is placed on the easel or planar member 43 for recording. Hence, there is no necessity for indexing or moving the record medium 10 as shown in FIG. 1. Also, the lamps 44 for exposing the document on the heat-light-sensitive layer 31 of the composite film 20 can be arranged off-center and in suitable positions to provide the necessary illumination of the document 41, when in position, for exposure. Otherwise, the procedure is substantially as described above.

Figure 10:
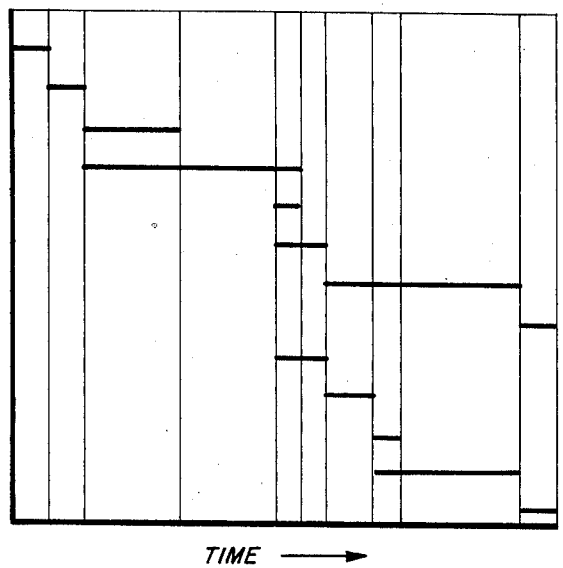
FIG. 10 is an operation diagram showing the relative timing of the various steps comprising a complete cycle of operation for the device in accordance with the invention.

There are a number of modifications that can be made with respect to the device disclosed and described hereinabove, particularly, with respect to the embodiments shown in FIGS. 1 and 3. For example, the cycle can be varied in order to provide the flash exposure step after there has been a partial cooling of the film 20 and receiving medium 27 while still in contacting relationship, rather than immediately after the heat has been cut off. This is shown in FIG. 10 with respect to the additional steps 5–9. It will be noted that the cycle is the same through exposure and heating for exposing and developing the heat-light-sensitive layer 31 on the composite film 20. However, before exposure of the vesicular layer 32 is made, the pressure applied by the pressure member 55 and the pressure pad 74 is released. The flash exposure of the vesicular layer 32 then occurs after a short interval of time during which the film 20 and receiving medium 27 are allowed to partially cool. This will necessitate a change in the movement of the linkage for the shielding members 91 and 93 in that they will not be movable into a protecting position until after the flash exposure has been made. This will be evident from viewing FIG. 8 in that the shielding member 91 moves under the film 20 and the medium 27, thereby blocking exposure through the transparent pressure member 55. As in the previously described cycle, after the flash exposure of the vesicular layer 32, the film 20 and receiving medium 27 are allowed to cool and are then stripped or separated to effect transfer of the image area on the vesicular area 32 to the thermoplastic layer 34 on the receiving medium 27.

A more detailed disclosure with respect to the operation and purpose of the timing as to the application of heat and the two exposures is deemed to be in order. The temperature of each of the heater elements 54 and 72 is maintained in accordance with the temperature determined by the output voltage of their respective sensor 56, 73 associated with the heat control unit 117. Heat flows from the heater 54 and the heater 72 into and through their respective heater blocks 53 and 71 and into the transparent pressure member 55 and the pressure pad 74. The purpose for heating the pressure pad 74 is to provide a nearly constant heating condition for the film 20 and receiving medium 27 independent of cycle rate or frequency of use with the heating station open between the cycles of operation. A total cycle time of about 5 seconds is required from initiation by actuation of switch 112 to complete release of the image area on the vesicular layer 32 with transfer to the receiving medium 27. Jets of air can be utilized to facilitate cooling and shortening of the cycle time, such jets of air being directed to the surfaces of the supports 30, 33. The unit pressures required in the device for clamping the two films depend upon the thickness of each of the several layers. For a typical application, the unit pressure varies from about 120 psi at the center of the image area to about 30 psi at the edge thereof.

The essential elements of the device fulfill their required functions by the characteristics of form and materials selected for them. The heat-light-sensitive layer 31 that is exposed through the transparent pressure member 55 is sensitive to light in the visible portion of the spectrum. The vesicular layer 32 exposed by light modulated by the developed image in the heat-light-sensitive layer 31 using light from the flash tube through the transparent pressure member 55 is sensitive to light in the invisible, particularly the ultraviolet portion of the spectrum. Hence, the transparent pressure member 55 must conduct light rather efficiently in these two regions of the spectrum. Furthermore, the pressure member 55 must conduct heat to the composite film 20 efficiently and sufficiently well for uniform development of the latent image on such film. It has been found that synthetic sapphire satisfies these requirements and is a commercially available material. The thickness of the member 55 is determined by the requisite heat transfer characteristics and the stress induced by the pressure exerted against the film 20 and receiving medium 27 by the pressure pad 74. The heater blocks 53 and 71 are, preferably, made of aluminum for conducting heat uniformly to the pressure member 55 and pressure pad 74. The support blocks 51 and 70 are preferably made of a thermally insulating material, preferably filled polytetrafluoroethylene, to reduce the heat loss into the framework of the device. The thickness, hardness and radius of curvature of the face of the pressure pad 74 are such as to provide optimum contact pressure distribution when in a clamping position with the pressure member 55.

Other modifications and configurations of the device are also possible. For example, exposure of the heat-light-sensitive layer 31 can be accomplished in a station removed from that as shown in FIG. 3. Hence, there will be no need for the lens 60 to be associated with the light source 59, as shown in FIG. 3. In this case, the cycle will not include the first exposure step but will follow the subsequent steps of heat development, exposure and heat development and finally transfer of the vesicular image layer to the receiving medium 27.

It is also possible to hold the pressure pad 74 stationary and move the pressure member 55 relative thereto. The pressure pad 74 need not be heated, if the operating parameters are such so as to permit the heated transparent platen 55 to be maintained in contact with the pressure pad 74 with no film nor receiving medium positioned therebetween. The pressure pad 74 will then be heated by conduction from the pressure member 55. In operation, the pressure member 55 and pressure pad 74 are separated so the film 20 and receiving medium 27 can be positioned therebetween and are then returned to a clamping position. The short duration of open time does not allow sufficient cooling of the pressure pad 74 to adversely affect the developing process for the latent image area on the heat-light-sensitive layer 31 or on the vesicular layer 32.

This device can be utilized with a variety of combinations of heat developable and/or processible photosensitive materials, silver, or nonsilver, of all spectral sensitivities with the obvious exception of infrared. It is conceivable that exposure of the heat-light-sensitive layer from the original can be of the same spectral content as the exposure through that layer to the print layer. The difference in light sensitivity, or speed of the two layers, or the clearing of dyes in the first photosensitive layer, can provide the differential in exposure of the two heat developable layers. If the layers are sensitive, respectively, to different portions of the spectrum, the use of ultraviolet radiation may not be necessary. Accordingly, two portions of the visible spectrum may be used in sensitization. Hence, the radiation to which the photosensitive layers are receptive can be defined as radiation of spectrally different frequencies.

A receiving medium as disclosed and described hereinabove is not a necessary part of operation of this device. The two heat developable photosensitive layers may be on separate supports as for quick recording with a positive strip output for projection or other use in a rapid retrieval system. With two strips as just described, it is conceivable that two transparent pressure members can be used with optical exposure from one side and print exposure from the other. This would necessitate optically clear characteristics for the print material to permit optical imaging therethrough.

The invention has been described in detail with particular reference to preferred embodiments thereof but it will be understood that other variations and modifications can be effected within the spirit and scope of the invention.

I claim:

1. Apparatus for imagewise exposing and developing an area of a first film having a heat-light-sensitive layer and an area of a second film having a vesicular layer, said apparatus comprising:
   a station for receiving the image to be reproduced;
   a first platen arranged in an aligned and spaced relation to the receiving station and comprising a transparent, pressure member and means for heating the pressure member;
   a second platen arranged in aligned and spaced relation to said first platen and comprising a generally resilient pressure pad;
   means operatively coupled to at least one of said platens for providing relative movement between a first position in which said platens are spaced for permitting the first and second films to be positioned therebetween with the heat-light-sensitive layer in contact with the vesicular layer and a second position in which the pressure member and pressure pad maintain the first and second films in intimate contact under pressure;
   first means, including a source of radiation of one spectral frequency for illuminating the image to be reproduced, for exposing that image through the first film onto an area of the heat-light-sensitive layer;
   means for controlling the heating means for a period of time equivalent to at least the exposure time to impart heat to the pressure member for trasfer to the first and second films and the pressure pad, such heat developing the image-exposed area on the heat-light-sensitive layer and conditioning the second film;
   second means including a source of radiation of a second and different spectral frequency for exposing the vesicular layer to the heat-developed image area on the heat-light-sensitive layer, while the layers are still in contact, the heat imparted to the second film by the first film causing development of the image on the vesicular layer generally simultaneously with the exposure thereof; and
   means for controlling the sequential operation of the moving means and the respective sources of radiation to provide a cycle of operation in which said platens are in said second position during exposure by the radiation of the one spectral frequency.

2. The device in accordance with claim 1 wherein the heat-light-sensitive layer and the vesicular layer are, respectively, responsive to radiation of different spectral frequencies in the visible portion of the spectrum.

3. The device in accordance with claim 1 wherein the heat-light-sensitive layer is responsive to radiation of a spectral frequency in the visible portion of the spectrum and the vesicular layer is responsive to radiation of a spectral frequency in the ultraviolet portion of the spectrum.

4. Apparatus for imagewise exposing and developing an area of a composite film, of the type having a heat-light-sensitive layer and a vesicular layer, and for transferring at least the developed image area on the vesicular layer to a receiving medium, said apparatus comprising:

a station for receiving the image to be reproduced;

a first platen arranged in an aligned and spaced relation to the receiving station and comprising a transparent, pressure member and first means for heating the pressure member;

a second platen arranged in aligned and spaced relation to the first platen and comprising a generally resilient pressure pad and second means for heating the pressure pad;

means operatively coupled to at least one of said platens for providing relative movement between a first position in which said platens are spaced for permitting the composite film and the receiving medium to be positioned therebetween with the vesicular layer in contact with the receiving medium and a second position in which the pressure member and pressure pad maintain the composite film and the receiving medium in intimate contact under pressure;

first means, including a source of visible radiation for illuminating the image to be reproduced, for exposing that image through the transparent pressure mamber onto an area of the heat-light-sensitive layer;

means for controlling the first and second heating means to impart heat to the pressure member and pressure pad for transfer, respectively, to the composite film and the receiving medium, such heat developing the image exposed area on the heat-light-sensitive layer and conditioning the receiving medium;

second means including a source of invisible radiation for exposing the vesicular layer to the heat-developed image area on the heat-light-sensitive layer, the imparted heat causing development of the image on the vesicular layer generally simultaneously with the exposure thereof; and means for controlling the sequential operation of the moving means, heating means and the respective sources of visible and invisible radiation to provide a cycle of operation in which said platens are in said second position during exposure by the first illuminating means, exposure by the second illuminating means is after development of the image exposed by said first illuminating means and the developed image area on the vesicular layer is transferred to the receiving medium after movement of said platens from said second position and cooling and separation of the composite film and the receiving medium.

5. The device in accordance with claim 4 wherein the transparent, pressure member comprises a sapphire plate.

6. The device in accordance with claim 4 wherein the resilient pressure pad is of silicone rubber.

7. The device in accordance with claim 4 wherein the invisible source of radiation is one producing ultraviolet light for flash exposing the vesicular layer.

8. The device in accordance with claim 4 including heat shielding means interconnected with at least one of said platens for movement between a shielding position in which the shielding means is between the pressure member and the pressure pad to reduce heat radiation loss when said platens are in said first position and a withdrawn position, when the platens are in the second position.

9. The device in accordance with claim 4 wherein the controlling means renders the second exposing means operative during the time the moving means returns the platens to the first position.

10. The device in accordance with claim 4 wherein the controlling means renders the second exposing means operative after the heating means have been rendered inoperative to permit partial cooling of the composite film and the receiving medium prior to exposure of the vesicular layer.

11. A device for imagewise exposing, developing and transferring to a receiving medium at least the developed image area on the vesicular layer of a composite film having an image-wise exposed area on the heat-light-sensitive layer thereof, the combination comprising:

a fixed platen comprising a transparent pressure member and first means for heating the pressure member;

a reciprocative platen arranged in aligned and spaced relation to the fixed platen and comprising a generally resilient pressure pad and second means for heating the pressure pad;

means operatively coupled to the reciprocative platen for moving the latter between a first position in which it is spaced from the fixed platen for permitting the composite film and the receiving medium to be positioned therebetween with the vesicular layer in contact with the receiving medium and a second position in which the pressure member and pressure pad maintain the composite film and the receiving medium in intimate contact under pressure;

means for activating the first and second heating means to impart heat to the pressure member and pressure pad for transfer, respectively, to the composite film and the receiving medium, the heat developing the imagewise exposed area on the heat-light-sensitive layer and conditioning the receiving medium;

means including a source of invisible radiation for exposing the vesicular layer to the heat-developed image area on the heat-light-sensitive layer, the imparted heat causing development of the image on the vesicular layer generally simultaneously with the exposure thereof; and means for controlling the sequential operation of the moving means, the first and second heating means and the source of invisible radiation to provide a cycle of operation in which the moving means and the heating means are operative during development of the imagewise exposed area by the first heating means and inoperative during exposure of the vesicular layer by the source of invisible radiation;

whereby the developed image area on the vesicular layer is transferred to the receiving medium upon cooling and separation of the composite film and the receiving medium.

* * * * *